(12) United States Patent
Sandvik et al.

(10) Patent No.: US 9,628,518 B1
(45) Date of Patent: Apr. 18, 2017

(54) LINKING A COLLABORATION SESSION WITH AN INDEPENDENT TELEPRESENCE OR TELEPHONY SESSION

(71) Applicant: Cisco Technology, Inc., San Jose, CA (US)

(72) Inventors: Kristian Sandvik, Oslo (NO); Magne Zachrisen, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/919,263

(22) Filed: Oct. 21, 2015

(51) Int. Cl.
*H04N 7/14* (2006.01)
*H04L 29/06* (2006.01)

(52) U.S. Cl.
CPC ........ *H04L 65/1066* (2013.01); *H04L 65/601* (2013.01); *H04L 65/607* (2013.01); *H04N 7/147* (2013.01)

(58) Field of Classification Search
USPC .......................................... 348/14.01–14.14
See application file for complete search history.

(56) References Cited

U.S. PATENT DOCUMENTS

| | | | |
|---|---|---|---|
| 7,283,154 B2 * | 10/2007 | Shachar | H04L 12/1818 348/14.08 |
| 2008/0316348 A1 | 12/2008 | Hallock | |
| 2010/0231556 A1 | 9/2010 | Mines et al. | |
| 2014/0245185 A1 * | 8/2014 | Knodt | H04L 65/1069 715/753 |
| 2015/0156395 A1 | 6/2015 | Bao et al. | |
| 2015/0288672 A1 * | 10/2015 | Patten | H04L 63/08 726/7 |

OTHER PUBLICATIONS

Cisco TelePresence Synch, May 20, 2015, cisco.com.
Polycom VisualBoard and UC Board, Mar. 15, 2015, polycom.com.

* cited by examiner

*Primary Examiner* — Maria El-Zoobi
(74) *Attorney, Agent, or Firm* — Lempia Summerfield Katz LLC

(57) ABSTRACT

An independent collaboration session is established through an existing media session. A computing device identifies a request for a collaboration session from a first user location. The collaboration session associated with the first user location and a second user location. The computing device identifies a media session between the first user location and the second user location. A collaboration address is extracted from the request for the collaboration session and encoded according to a codec of the media session. The encoded collaboration address is sent from the first user location to the second user location through the video session.

20 Claims, 8 Drawing Sheets

LINKING A COLLABORATION SESSION WITH AN INDEPENDENT TELEPRESENCE OR TELEPHONY SESSION

TECHNICAL FIELD

This disclosure relates in general to the field of collaboration sessions, and more particularly, to linking a collaboration session with another independent audio or video session.

BACKGROUND

Many collaboration tools for creating ad hoc content work well in local environments. A collaboration session may be an online meeting in which two or more users share a viewing display for editing or reviewing documents, virtual notes, a whiteboard, or any other applications. The collaboration session may be initiated by a user who provides other users with an email or link for joining the collaboration session.

Online collaboration tools may be accessed in the cloud to allow collaborative processes without requiring participants to be in the same room. These types of web based tools may be shared by users in a video or audio session. A link may be emailed or otherwise communicated between users. However, the users must still establish both the audio or video session and the collaboration session separately.

BRIEF DESCRIPTION OF THE DRAWINGS

Exemplary embodiments of the present embodiments are described herein with reference to the following drawings.

DESCRIPTION OF EXAMPLE EMBODIMENTS

Overview

Figure 1:
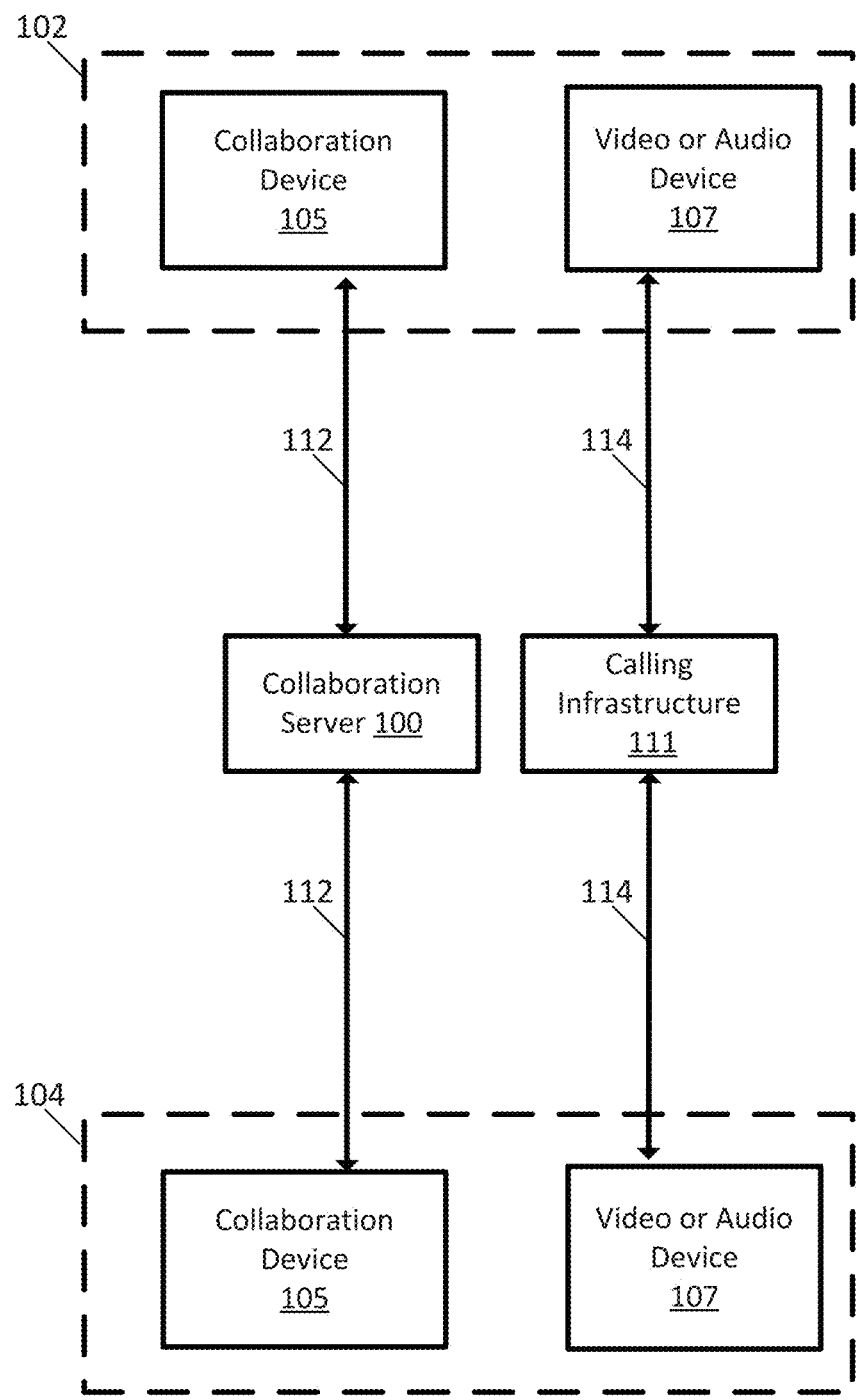
FIG. 1 illustrates an example linked collaboration session and media session.

In an embodiment, a method includes identifying a request for a collaboration session from a first user location, the collaboration session associated with the first user location and a second user location, identifying a video session between the first user location and the second user location, extracting collaboration connectivity information from the request for the collaboration session, formatting the collaboration connectivity information according to a control channel of the video session, and sending the collaboration connectivity information from the first user location to the second user location through the video session.

In another embodiment, an apparatus includes a processor and a memory comprising one or more instructions executable by the processor to perform identifying a request for a collaboration session from a first user location, the collaboration session associated with the first user location and a second user location, identifying a media session between the first user location and the second user location, extracting a collaboration address from the request for the collaboration session, encoding the collaboration address according to a video codec of the media session, and sending the encoded collaboration address from the first user location to the second user location through the media session.

In one embodiments a non-transitory computer readable medium includes instructions that when executed are configured to cause a processor to identify a request for an interactive collaboration session from a first user device; wherein the interactive collaboration session is associated with the first user device and a second user device, identify a media session between the first user device and the second user device, wherein the media session includes a control channel, and send connectivity information for the collaboration session through the control channel of the media session.

EXAMPLE EMBODIMENTS

Users of collaboration tools in combination with a separate communication tool are faced with the burden of establishing two separate session. This involves communicating the instruction, link, or login information for one of the sessions using another mode of communication. Users may send emails of calendar requests to communicate this information. For example, first a telephone call, video conference, or other session is established, and then the connection information for the collaboration tool is shared using through email or another communication channel. Communication tools include, traditional telephony, internet protocol (IP) telephony, telepresence, video conferencing, audio conferencing, or others.

When setting up collaboration sessions across sites users may use tools like whiteboards, virtual sticky notes, or others. These tools work well in local sessions for creating ad hoc content, but with remote participants, the analog tools are more difficult to use effectively. Collaboration tools include web based tools that allow collaborative processes that do not require participants to be in the same room or location. The collaboration tools may be a service accessed from the cloud. Collaboration tools can include (but are not limited to) electronic whiteboards, virtual sticky notes, screen sharing, scrum boards, pin boards, brainstorming tools, visual management boards, ideation templates, or other tools that require real time synchronization across sites.

When using these collaboration tools, users likely also want to be able to communicate using high quality audio and video. This means using a different channel for audio and video, introducing burden for users that want to use web based tools, because the users must make sure that all participants are able to join both sessions, the web based collaboration session and the audio/video based communication session.

The following embodiments provide systems and processes for providing the connection information for the second session through the first session. The first and second session use different software or protocols. The second session may be automatically established, or the user may be prompted and the second session may be established based on a user command from the prompt. In one example, the first session is a video conference and the connection information for the collaboration tool of the second session is transmitted using a control channel of the video conference.

FIG. 1 illustrates an example linked collaboration session and media session. A remote location 102 includes a collaboration device 105 and a video or audio device 107. A local location 104 includes a collaboration device 105 and a video or audio device 107. At least one network connects the remote location 102 and the local location 104. The collaboration devices 105 communicate using a collaboration communication path 112, which is managed by a collaboration server 100. The collaboration server 100 manages the collaboration devices 105 from multiple endpoints. The collaboration service 100 may register the collaboration devices 105 and exchange messages between the collaboration devices 105. The video or audio devices 107 communicate using a video communication path 114 and a calling infrastructure 111. The calling infrastructure 111 includes devices for establishing and maintaining a video or audio session between the video or audio devices 107. Example devices may include multipoint control units (MCUs), video bridges, gateways, firewalls, and network address translation (NAT) devices. Additional, different, or fewer components may be included.

The video or audio device 107 may include a controller or a processor, and instructions executable by the processor or the controller to forward connectivity information for establishing the collaboration session. The collaboration session may be initiated by either location (102 or 104). The collaboration device 105 in the initiating location forwards on a request with information about the collaboration server to the video device 107 in that location, which in turn transfers this information over the calling infrastructure 110 to the video or audio device in the other location 107. The video or audio device 107 in the receiving location may identify a request for a collaboration session from the initiating location and passes on the request to the collaboration device 105. The collaboration device 105 connects to the collaboration server 100 and accesses the collaboration session using the token or address contained within the request identified by the audio or video device 107. The request may be received through a user input on a screen or input device. The request may be received through the network 110. The request may include a name or address for the remote location 102 and/or the local location 104.

The video device 107 may identify an existing video session between the remote location 102 and the local location 104. The video session may be a video conference. The video session may be defined one or more protocols. The video session may be defined by any combination of an audio codec (e.g., G.711 or G.729 as established and maintained by the International Telecommunication Union (ITU)), and a video codec (e.g., H.264, moving picture experts group (MPEG) 4, high efficiency video coding (HEVC), or other standards). The video session may be packaged in real-time transport protocol (RTP) packets suitable for transport on an IP network. The video session may be across an encrypted link (e.g., secured sockets layer (SSL)) between the video device 107 and a server in the network 110.

The video device 107 may match a name or requester address from the request for the collaboration session with the existing video session. In other words, the video device 107 may extract a collaboration address or other collaboration connectivity information from the request for the collaboration session when a name or requestor address matches that of one or more existing video session. The requestor address or name identifies the initiator of the collaboration session. The collaboration address identifies the address of the collaboration service.

When a video session includes a corresponding name or address, and thus, matches the request for the collaboration session, the video device 107 of one of the remote location 102 or the local location 104 of sends the collaboration connectivity information to the video device 107 of the other one of the remote location 102 or the local location 104. The collaboration connectivity information may include the collaboration address. However, it is not necessary that an address or URL be exchanged. Instead, the collaboration connectivity information could be a token, encryption key, or a unique identifier as part of the collaboration address. The collaboration connectivity information is information sufficient to provide the collaboration address to the other endpoint, but not necessarily the entire collaboration address. The collaboration connectivity information includes the data needed to transfer from one site to another to allow the endpoint to use the collaboration service.

In an enhanced security embodiment, it may be preferred to not transfer a URL at all because the URL may be intercepted and used by a man in the middle to get access to the data. Instead, the collaboration connectivity information may include only a part of the information that is needed to access the content, such as an identificator to a specific session (e.g., session identifier), but not the collaboration address to the service itself. Thus, both endpoints may be pre-loaded with the address of the collaboration service and receive the session identifier through the video or audio session.

The video device 107 may format the collaboration connectivity information for transmission using a control channel of the video session. The video device 107 may send the collaboration connectivity information from the first user location to the second user location through the control session. The collaboration address may be encoded or incorporated in the control signal or control channel of the video session using the video codec. The control channel may be a back channel for data not normally visible to the end user. The control signal may include specifications for sizes and arrangement of one or more frames of the video session. For example, the control channel may include messages exchanged between the video devices 107. Each video device may specify, through the control signal, characteristics of the video streams that are compatible with or prefer to receive. The characteristics of the video stream may include resolutions, dimensions, codecs, or other characteristic of the video. The control signal may also include participant information for the video session. The participant information may include addresses or names of the participants and a status of each participant. The status of each participant may indicate a user is speaking, present, invited, muted or other statuses.

The control channel may be a uniform datagram packet (UDP) based communications channel. The control channel may be negotiated, in a manner similar to that of video and audio streams, using the Session Description Protocol (SDP). The collaboration address or connectivity information, as well as other control information, passed over the control channel is routed using the same paths an algorithms as the media of the video session. Accordingly, the data on the control channel, including the collaboration address, has the same firewall traversal properties as the audio and video of the video session. This makes the control channel optimized for transmitting data accompanying the video session.

The control channel may support any application layer protocol. The messages of the control channel may be extensible markup language (XML) based, and each message include a "message type" portion and a "content" portion. An example share XML message communicated via the video session through the control channel may be:
<message type="share/url">
<content>https://example.collaborationservice.com/1234567890abcdef1234567890/</content>
</message>

In this example, the collaboration address utilized by collaboration device 105 is sent to video device 107 and transmitted through the control channel to the other location. This example collaboration address may be for a whiteboard server or another collaboration service (e.g., https://example.collaborationservice.com/) and include a unique identifier (e.g., 1234567890abcdef1234567890) that identifies the particular collaboration session. Thus, the collaboration device user shares a whiteboard with other participants through the video session control channel (e.g., part of video communication path 114). The video device 107 at one location may send the share command for the URL including the collaboration address to the video device 107 at the other location.

In some examples, a particular video device 107 or collaboration device 105 may become disconnected. Alternatively, the request for the collaboration address may come from the other location. In either of these example, the video device 107 may send a pull XML message for requesting the last shared the uniform resource locator (URL) from other participants: <message type=pull/url/>. One or more of the other participants may receive the request for the last URL or collaboration address, access the URL or collaboration address from memory, and return the URL or collaboration address such as with a share XML message. The video device 107 at one location may send the pull command for a uniform resource locator including the collaboration address to the video device 107 at the other location, which in response returns the URL and/or the collaboration device to the requesting video device 107.

In one alternative, the control channel, rather than being a part of the video communication path 114, is routed through a cloud service that is the video devices 107 have a persistent connection to or are securely registered to. The control messages (e.g., share XML message and pull XML message) are passed through the cloud service.

Upon receipt of a collaboration device, a video device 107 may prompt the user to connect to the collaboration session. The prompt may be a window or icon displayed in the video session with data indicative of the collaboration session that has been initiated. The user may enter an input in response to the prompt, which causes the video device 107 to communicate with the collaboration device 105 to connect to the collaboration session. Thus, the collaboration session is connected at the user location in response to receipt of the incorporated collaboration address.

Figure 2:
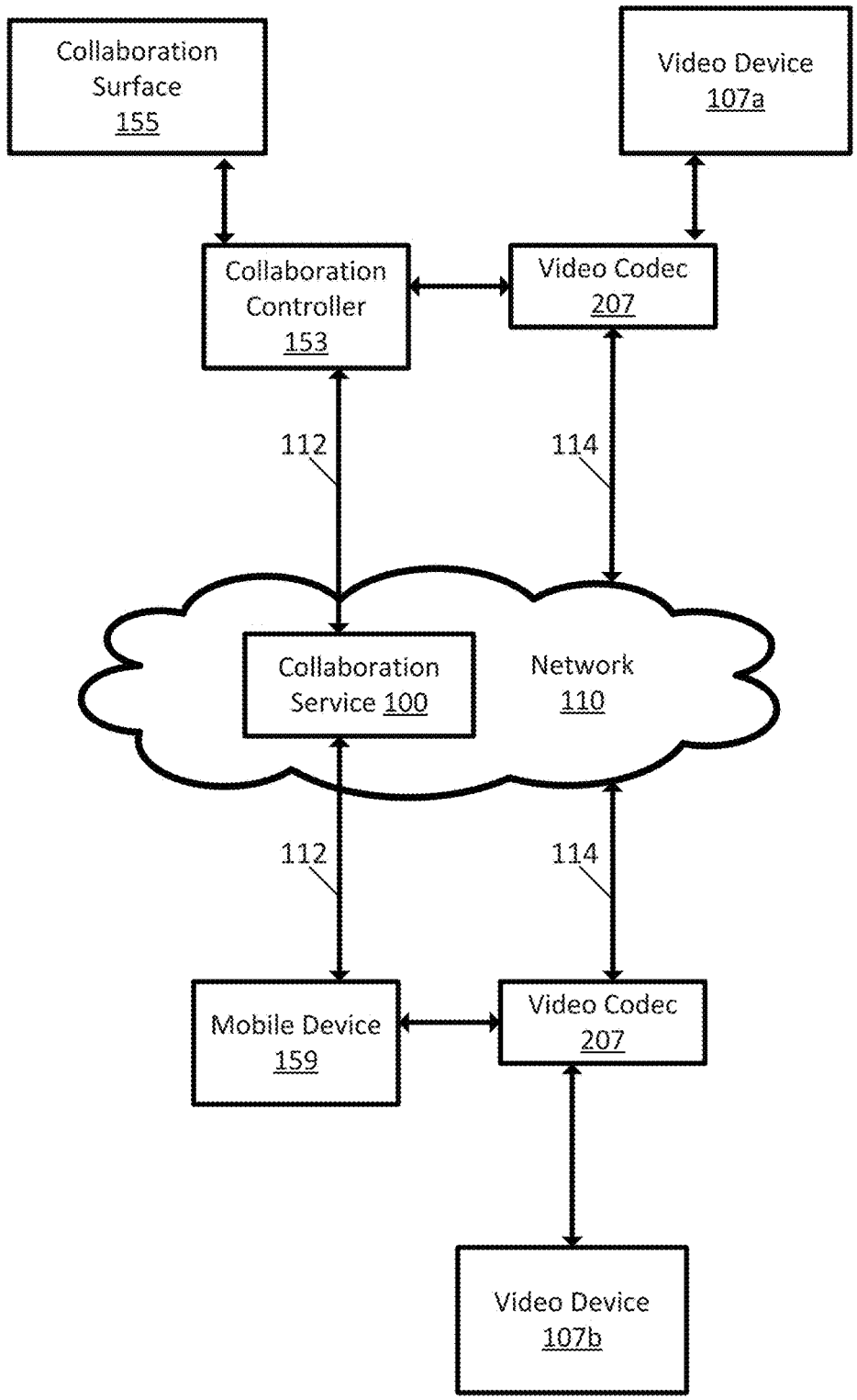
FIG. 2 illustrates an example linked collaboration session and media session with an arrangement of separate devices.

FIG. 2 illustrates an example linked collaboration session and media session with an arrangement of separate devices. The embodiment of FIG. 2 includes a video device 107a, a collaboration controller 153 and a collaboration surface 155 on one side of the collaboration session. As illustrated, the other side of the collaboration session includes a mobile device 159 and a vide device 107b. Both sides may utilize either example of mobile devices or dedicated collaboration devices. In addition, each side includes a video codec 207. Additional, different, or fewer components may be included.

The collaboration controller 153 may be a laptop, a computer, a tablet, or a specialized device that controls the collaboration surface 155. The collaboration controller 153 may connect to the network 110 on behalf of the collaboration surface 155. The collaboration surface 155 may be a white board or other input device that allows users to receive and send data to the collaboration session. Users may draw or write on the collaboration surface 155, and data indicative of these inputs is passed by the collaboration controller 153 to the other location or endpoint via the collaboration server 100. Either side (e.g., remote location and local location) or both may include the collaboration controller 153 and the collaboration surface 155.

On the other side of the collaboration session in the example shown in FIG. 2, is a mobile device 159. The mobile device 159 may be a smartphone, laptop, tablet, or other type of computing device. The mobile device 159 may connect to the collaboration session through the collaboration server 100 using a collaboration address received via the video session established between video device 107a and video device 107b using the video codecs 207.

The video codec 207 (encoder and decoder combination) may be an electronic circuit or a set of instructions that are configured to compress and decompress video. The video codec 207 receives raw vide data from the video devices 107a-b and compress the video data for transmission over the video session. The video codec 207 may be specialized for one or more video standards or specifications.

The video devices 107a and 107b may establish local pairing session between the respective video devices and a second device at the same location. The video device 107b may be paired with the mobile device 159 in a local pairing session. The local pairing session may be established using a variety of pairing mechanisms, including Ethernet, Bluetooth, ultrasound, and near field communication (NFC). The local pairing session enables sending the encoded collaboration address from the collaboration session to the video session and vice versa.

In some instances, the local pairing session may be established in response to generation of the collaboration session. In some instances, the local pairing session is established automatically when the devices are in proximity to one another.

Figure 3:
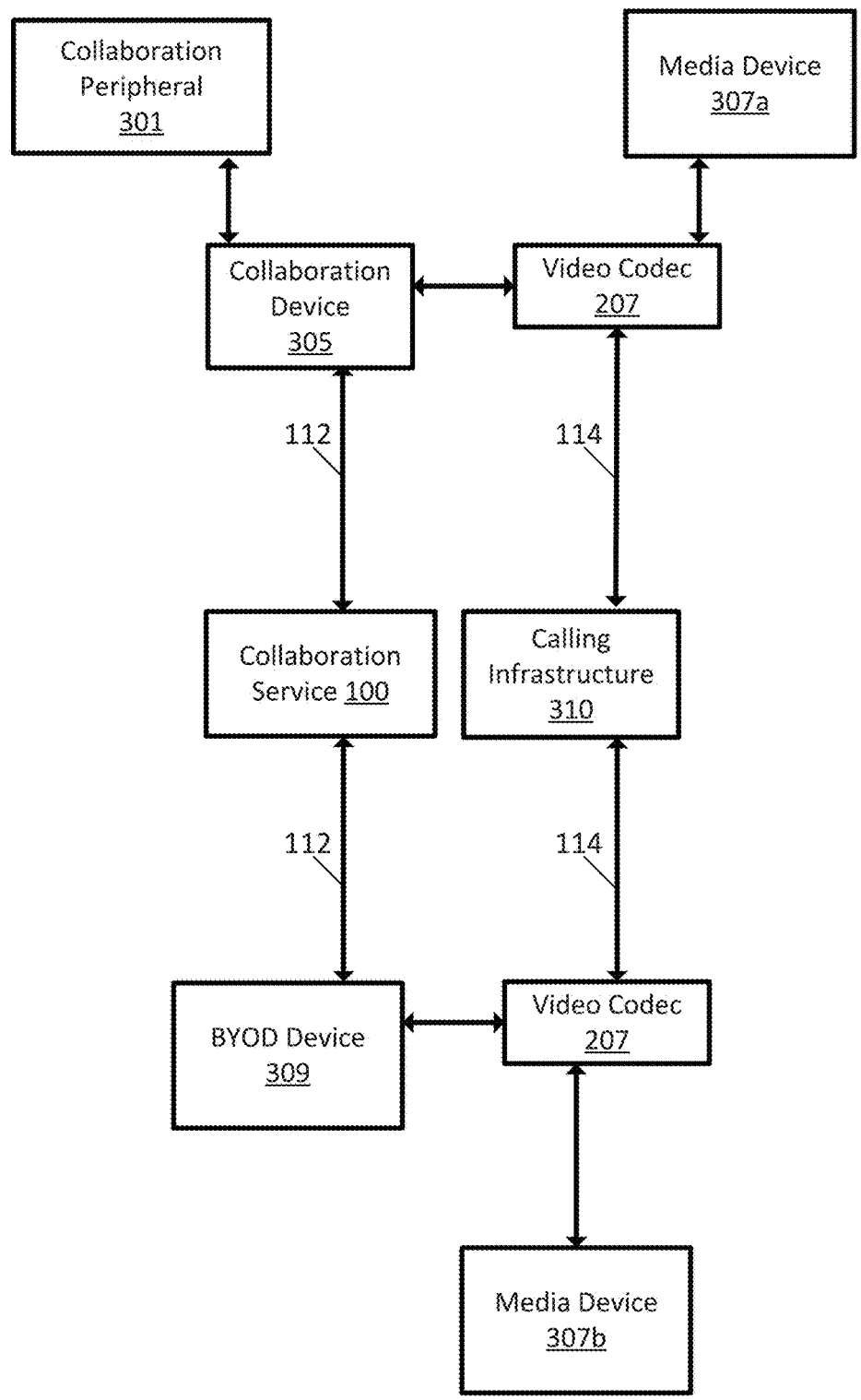
FIG. 3 illustrates an example linked collaboration session and media session with another arrangement of separate devices.

FIG. 3 illustrates an example linked collaboration session and media session with another arrangement of separate devices. The embodiment of FIG. 3 includes a collaboration device 305 and a collaboration peripheral 301 on one side of the collaboration session. As illustrated, the other side of the collaboration session includes a bring your own device (BYOD) device 309. A media session is established between a media device 307a and a media device 307b. A media device may include any combination of one or more speakers, a display, a camera, and a microphone. In addition, media devices may include orientation sensors such as accelerometers, gyroscopes, and magnetic sensors. Additional, different, or fewer components may be included.

As described above, local pairing sessions may be established between the local controller 317 and the BYOD device 309, or between the collaboration device 304 and the collaboration peripheral 301.

An application running on the collaboration device 305 may be continually or substantially permanently connected to the media device 307a. The connection may be an SSL connection. The collaboration device 305 stored in memory an identifier for the collaboration device 155 based on a user input when the collaboration device 305 first boots up, is powered on, or connected.

Messages can be sent from the collaboration device 305, via a controlled channel of the media device 307a, to the receiving media device 307b. On the receiving end, such a message is received and identified by the receiving media device 307b as a collaboration event. The message may include a header or an alphanumeric code indicative of being a collaboration event. When a collaboration event is received by the receiving media device 307b, this event is passed on to the paired collaboration device via the persistent SSL connection.

The media infrastructure 310 may include devices and instructions configured to establish and maintain the media session between the media device 307a and the media device 307b. The media infrastructure 310 may exchange media data (audio, video, or both) between the media device 307a and the media device 307b. The video infrastructure may provide the control channel between the media device 307a and the media device 307b.

The control channel and/or communication path 114 may be configured for at least two types of XML based messages for communication between the collaboration devices. When needed, for example when a new whiteboard is opened on the collaboration device 305, an XML based message of type "share/url" with the URL of the whiteboard as "content" is transmitted from the collaboration device 305, via the paired media device 307a. The share message may be addressed to individual designate endpoints or to all existing video devices that are in the video session with the media device 307a.

On the receiving side, the media device 307b identifies that the XML message is a collaboration event. Upon receiving a "share/url" type event, the URL is opened on the receiver side collaboration device, which in the illustration of FIG. 3 is BYOD device 309. However, other collaboration devices or peripherals may be used for whiteboarding, posting notes, or otherwise sharing real time data between the endpoints.

Different URLs may result in different actions taken to open that URL. For example, different URLs may correspond to different applications within the receiving endpoint. One URL may correspond to a whiteboard opened in a native whiteboard application, and another URL may correspond to posting notes using a web browser.

Figure 4A:
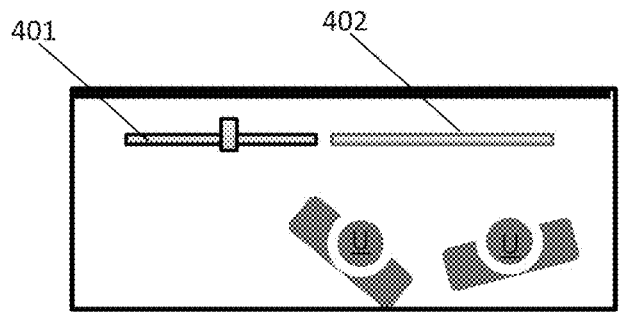
FIGS. 4A-4E illustrates example setups of collaboration devices.
Figure 4B:
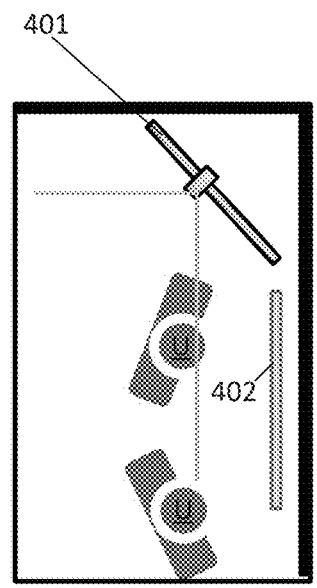
Figure 4C:
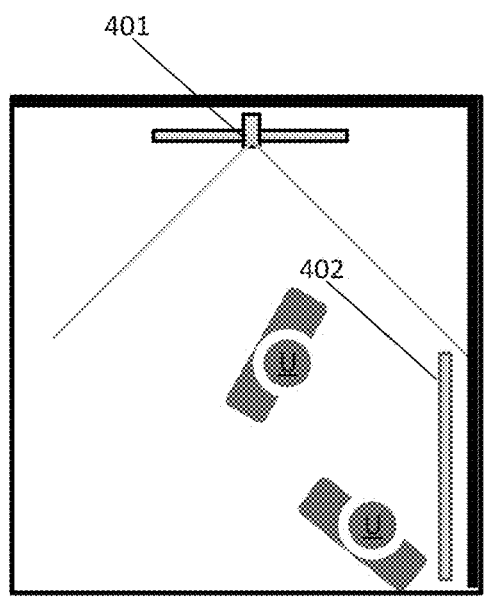
Figure 4D:
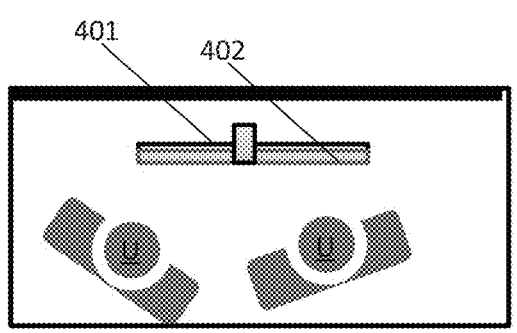
Figure 4E:
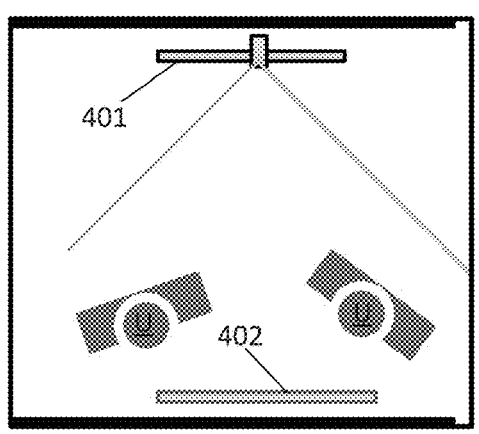

FIGS. 4A-4E illustrates example setups of collaboration devices. The various arrangements are shown to illustrate possible spatial relationships between media devices and collaboration devices to provide convenient setups for users U. In FIG. 4A, media device 401 and collaboration device 402 are arranged horizontally linearly in a plane. In FIG. 4B, the media device 401 and collaboration device 402 are arranged at an acute angle to one another. In FIG. 4C, the media device 401 and collaboration device 402 are arranged approximately perpendicular to one another or in perpendicular planes. This arrangement provides plenty of space for the users U to interact, while keeping the users and collaboration device 403 within the range of the camera of the media device 401. In FIG. 4D, the media device 401 and collaboration device 402 are arranged vertically linearly. Alternatively, the media device 401 and collaboration device 402 may be a single device. In FIG. 4E, the media device 401 and collaboration device 402 face one another such that the users' U backs are to the camera of the media device 401 when using the collaboration device 402. This arrangement simulates a classroom setting or a presentation setting.

The user U establishes a call or video conference (media session) using the media device 401. The user U starts using a collaboration service while in the media session. As described in the embodiments above, the collaboration address or connectivity information for the collaboration service are automatically exchanged using the media session. Thus, the other endpoints instantly show the same collaboration canvas, without the need for exchanging URLs over email, or other user messaging. For the user on the other end no interaction is needed. When someone in a media session starts using a collaboration service, the collaboration service is instantly and automatically be available to the other collaboration devices.

Figure 5:
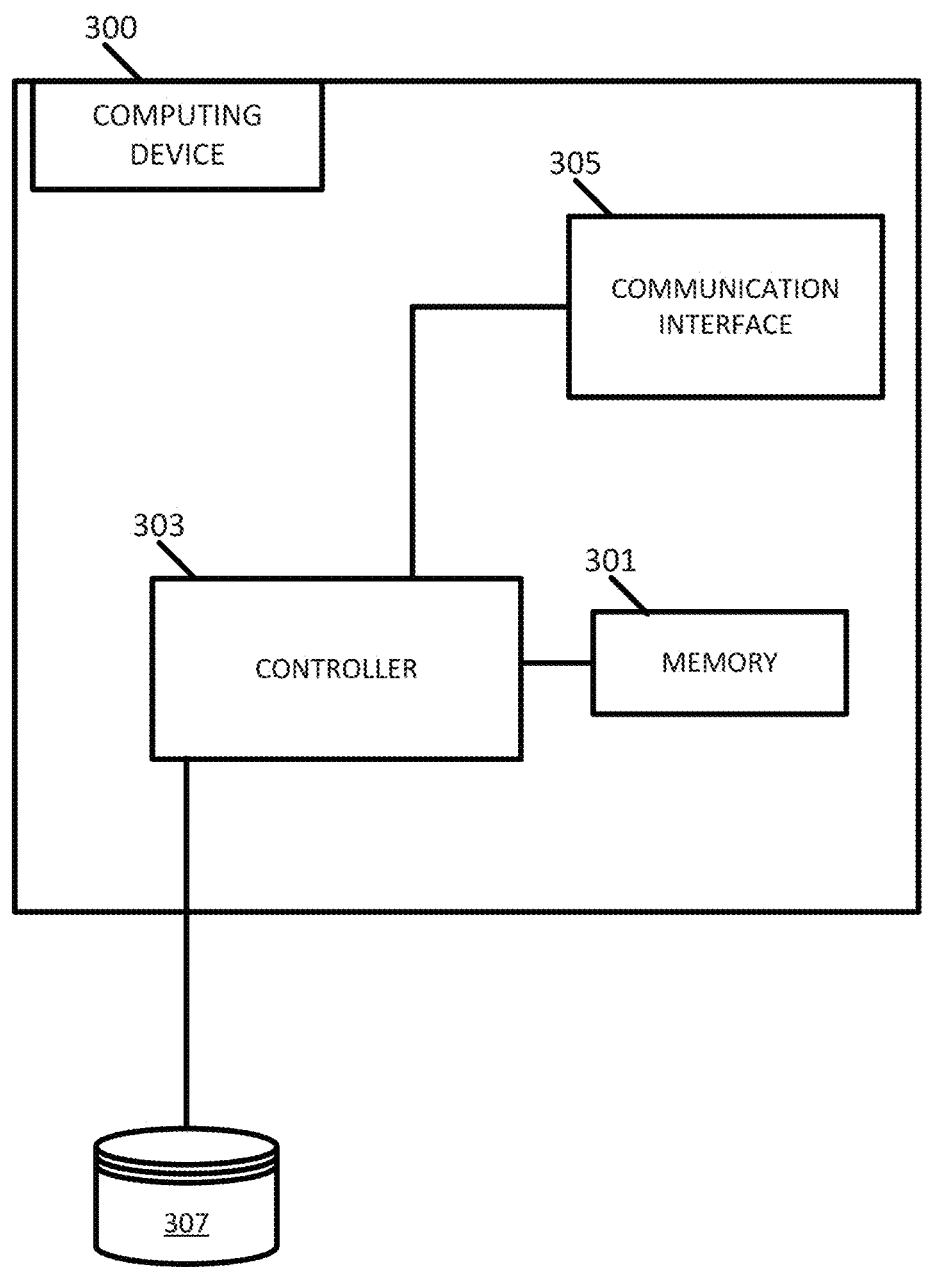
FIG. 5 illustrates an example network device for the systems of FIGS. 1-3.

FIG. 5 illustrates an example computing network device 300 such as the video devices 107, 107a, 107b, media devices 307a, 307b, collaboration controller 153, which may be referred to alternatively or collectively as a computing network device. The computing network device includes at least a memory 301, a controller 303, and a communication interface 305. Additional, different, or fewer components may be provided. Different network devices may have the same or different arrangement of components.

Figure 6:
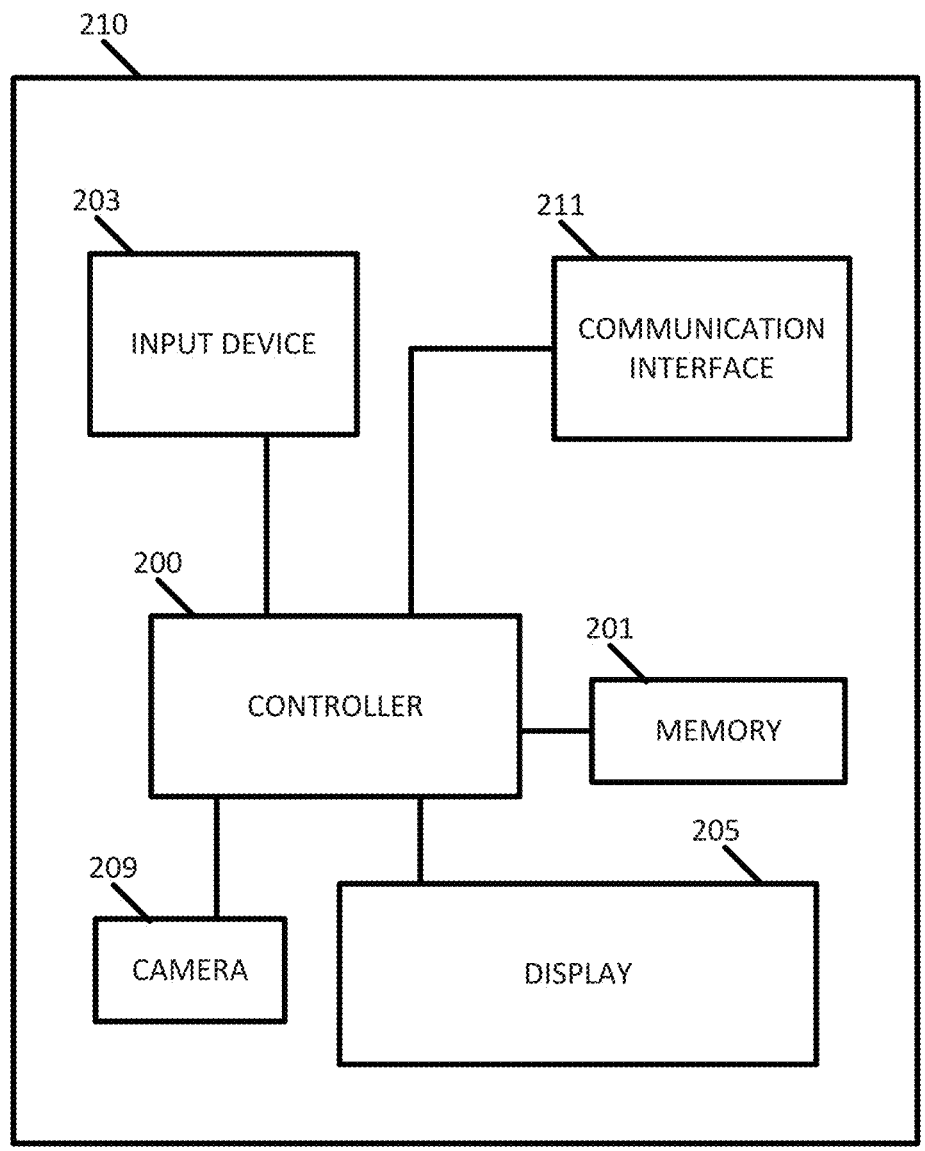
FIG. 6 illustrates an example endpoint device for the systems of FIGS. 1-3.

FIG. 6 illustrates an example computing endpoint device 210 such as the mobile device 159, collaboration device 105, or any device that may be interacting with the user. In some examples, video devices 107, 107a, 107b, media devices 307a, 307b, and collaboration controller 153 may also be computing endpoint devices. The computing endpoint device 210 may include a controller 200, a memory 201, an input device 203, a camera 209, a communication interface 211 and a display 205. Additional, different, or fewer components may be provided. Different network devices may have the same or different arrangement of components.

Figure 7:
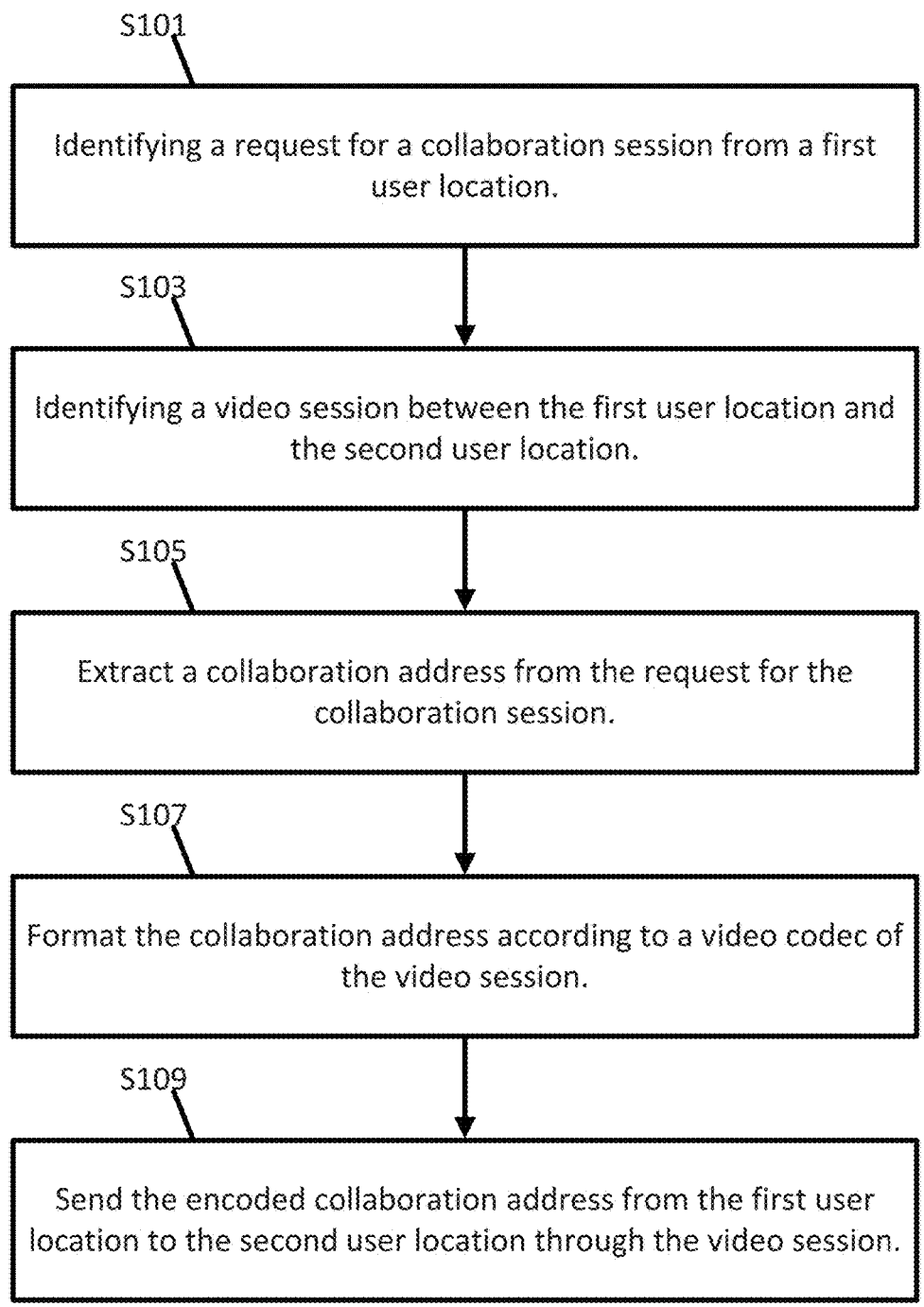
FIG. 7 illustrates an example flowchart for linking a collaboration session and media session.

FIG. 7 illustrates an example flowchart for linking a collaboration session and media session, which may be performed by the computing device or a combination of computing devices. Additional, different, or fewer acts may be provided. The acts are performed in the order shown or other orders. The acts may also be repeated.

At act S101, the controller 303 identifies a request for a collaboration session from a first user location. The user may be local to the endpoint computing device 210, and the request is received via the input device 203 and sent to the controller 200 via the communication interface 211 and communication interface 311. The collaboration session is associated with the first user location and a second user location. The request for the collaboration session may list IP addresses, usernames, or geographic locations associated with the first and second user locations.

At act S103, the controller 303 identifies a video session between the first user location and the second user location. Available video sessions for multiple endpoints may be stored in memory 301. The controller 303 may access the list of available video session from the memory 301. Alternatively, the controller 303 may monitor the current video sessions.

At act S105, the controller 303 extracts a collaboration address from the request for the collaboration session. The collaboration address may be extracted by a flag or field name. The collaboration address may identify a name or address of a collaboration service. Example services may be identified based on a list of available collaboration services including any combination of brainstorming, services, screen share services, white board drawing services, or others.

At act S107, the controller 303 formats the collaboration address according to a video codec of the video session. In other words, the existing video session is used to transfer connection information to set up a new collaboration session. In some examples, the video session already includes a control session suitable for communicating the collaboration address. The controller 303 generates one or messages based on the format of the video codec and the control channel and including data descriptive connection information to set up the collaboration session.

At act S109, the communication interface 305 sends the one or more messages with the collaboration address from the first user location to the second user location through the video session (e.g., through the control channel or control path). The messages may be encrypted and decrypted in between the first and second locations. The messages may be encapsulated and routed according to various protocols specific to the video codec or the networks therebetween.

The described embodiments enable the same kind of informal ideation and visual explanation that previously required physical co-location. When physically co located, a user can use paper, napkins, whiteboards, flipovers, to explain and develop ideas together. The described embodiments enable the same type of ad hoc shared surface for making sketches and building on top of others' ideas. The faster creation of new ideas, quicker problem solving across locations improves efficiencies in communication. Additional advantages include the impact the travel budget, but more importantly, it enables users to have better communication across sites on a regular basis and make decisions faster, making sure everyone is on the same page. Because previously unrelated communication tools (collaboration session versus media session) can now be utilized together with less user involvement, more availability is available for any informal collaboration tool with any communication tool. The tools do not have to be fully integrated to achieve seamless operation.

Figure 8:
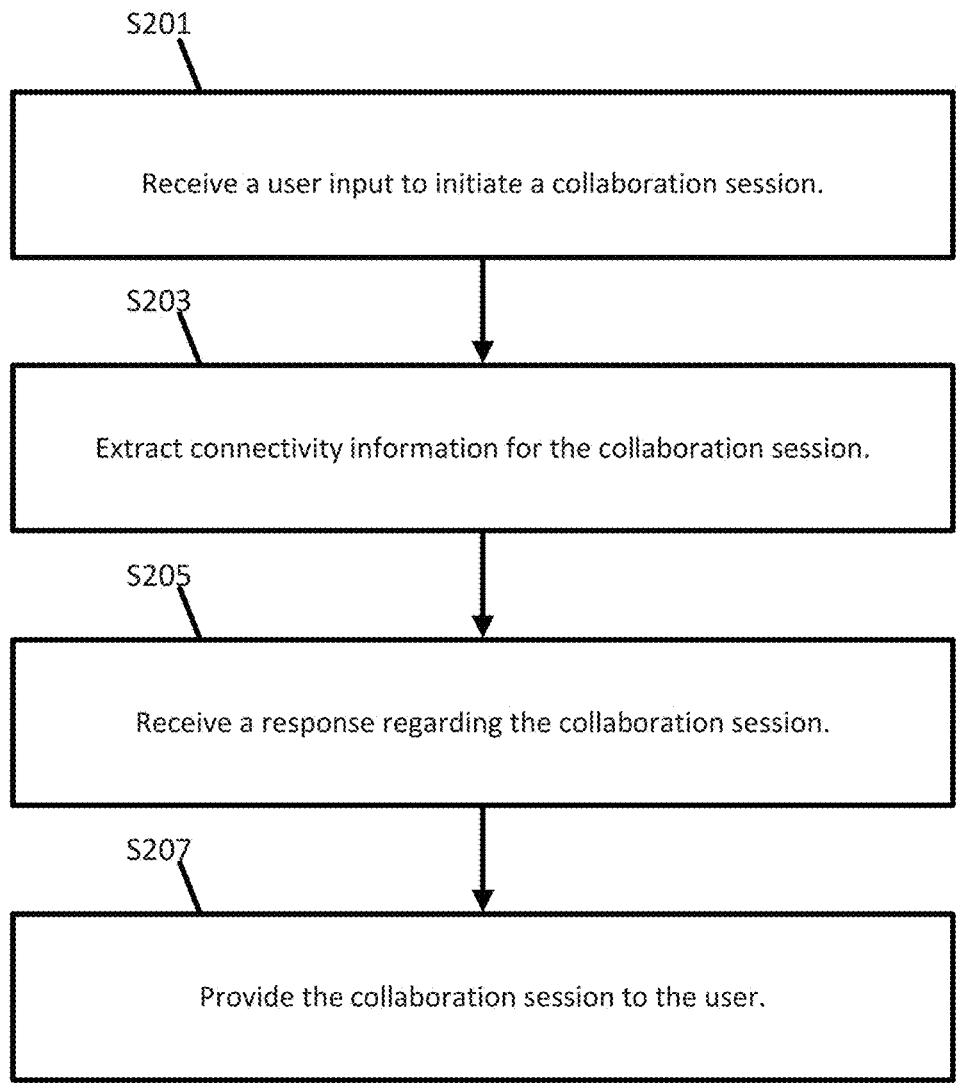
FIG. 8 illustrates an example flowchart for linking a collaboration session and media session.

FIG. 8 illustrates an example flowchart for a muting endpoint in cross muting for echo cancellation. Additional, different, or fewer acts may be provided. The acts are performed in the order shown or other orders. The acts may also be repeated.

At act S201, the input device 203 or controller 200 receives a user input to initiate a collaboration session. The user input to initiate the collaboration session may be received in a video session. For example, in a video conference a button may be available for launching a collaboration session. However, more significantly, the collaboration session may be launched in another application or by another device that is not involved in the video session. The collaboration session and video session may be connected to different devices or different interfaces to the user.

At act S203, the controller 200 may process the request to initiate a collaboration session or forward the request to a device associated with the video session, where the request is processed, to extract connectivity information for the collaboration session. The connectivity information is sent as part of the video session to the other endpoint device. As described in examples herein, the connectivity information may be encoded according to the codec of the video session, then formatted and transmitted according to a control channel of the video session.

At act S205, the controller 200 receives a response from the other endpoint. Regarding the collaboration session. The response may be sent using the control channel of the video session. Thus, the response may also be relayed by the video device. The response may be decline or other wire a negative response. The user may be informed that the collaboration is not available. However, if the response is in the affirmative or an acceptance, the controller 200 proceeds to act S207.

At act S207, the controller 200 provides the collaboration session to the user. The controller 200 may launch an application for collaboration such as whiteboarding or any of the examples described herein. The collaboration session proceeds outside of the video session. Thus, the video session is used to simplify establishment of the collaboration session, but the video session and the collaboration session remain independent thereafter. The controller 200 may inform the video device that the collaboration session is established and further negotiation using the control channel of the video session is not needed.

The input device 203 may be one or more buttons, keypad, keyboard, mouse, stylist pen, trackball, rocker switch, touch pad, voice recognition circuit, or other device or component for inputting data to the endpoint 103. The input device 203 and the display 205 may be combined as a touch screen, which may be capacitive or resistive. The display 205 may be a liquid crystal display (LCD) panel, light emitting diode (LED) screen, thin film transistor screen, or another type of display.

The controllers 200 and 303 may include a general processor, digital signal processor, an application specific integrated circuit (ASIC), field programmable gate array (FPGA), analog circuit, digital circuit, combinations thereof, or other now known or later developed processor. The controller 303 may be a single device or combinations of devices, such as associated with a network, distributed processing, or cloud computing.

The memories 201 and 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device 103, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The memories 201 and 301 are non-transitory computer-readable media, which may be a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   identifying a request for a collaboration session from a first user location, the collaboration session associated with the first user location and a second user location;
   identifying a video session between the first user location and the second user location;
   extracting collaboration connectivity information from the request for the collaboration session;
   formatting the collaboration connectivity information according to a control channel of the video session; and
   sending the collaboration connectivity information from the first user location to the second user location through the video session.

2. The method of claim 1, wherein the collaboration session is connected at the second user location in response to receipt of the collaboration connectivity information, wherein the collaboration connectivity information includes at least a portion of a collaboration address.

3. The method of claim 1, wherein the collaboration connectivity information is sent through the control channel of the video session via an extensible markup language (XML) message.

4. The method of claim 1, further comprising:
   establishing a local pairing session between a first device at the first user location and a second device at the first user location.

5. The method of claim 1, further comprising:
   establishing a local pairing session between a first device at the second user location and a second device at the second user location.

6. The method of claim 5, further comprising:
   sending the collaboration connectivity information through the local pairing session.

7. The method of claim 5, wherein the first device at the second user location includes a whiteboard device.

8. The method of claim 1, further comprising:
   sending a share command for a uniform resource locator including the collaboration connectivity information.

9. The method of claim 1, further comprising:
   receiving a pull command for a uniform resource locator including the collaboration connectivity information.

10. An apparatus comprising:
    a processor; and
    a memory comprising one or more instructions executable by the processor to perform:
      identifying a request for a collaboration session from a first user location, the collaboration session associated with the first user location and a second user location;
      identifying a media session between the first user location and the second user location;
      extracting a collaboration address from the request for the collaboration session;
      encoding the collaboration address according to a video codec of the media session; and
      sending the encoded collaboration address from the first user location to the second user location through the media session.

11. The apparatus of claim 10, wherein the collaboration session is connected at the second user location in response to receipt of the encoded collaboration address.

12. An apparatus comprising:
    a processor; and
    a memory comprising one or more instructions executable by the processor to perform:
      identifying a request for a collaboration session from a first user location, the collaboration session associated with the first user location and a second user location;
      identifying a media session between the first user location and the second user location;
      extracting a collaboration address from the request for the collaboration session;
      encoding the collaboration address according to a video codec of the media session; and
      sending the encoded collaboration address from the first user location to the second user location through a control channel of the media session via a collaboration message.

13. The apparatus of claim 10, wherein a local pairing session between a first device at the first user location and a second device at the first user location is established and the encoded collaboration address is communicated through the local pairing session.

14. The apparatus of claim 10, wherein a local pairing session between a first device at the second user location and a second device at the second user location is established and the encoded collaboration address is communicated through the local pairing session.

15. The apparatus of claim 14, wherein the first device at the second user location includes a whiteboard device.

16. The apparatus of claim 14, wherein a command for a uniform resource locator includes the collaboration address.

17. A non-transitory computer readable medium including instructions that when executed are configured to cause a processor to:
- identify a request for an interactive collaboration session from a first user device; wherein the interactive collaboration session is associated with the first user device and a second user device;
- identify a media session between the first user device and the second user device, wherein the media session includes a control channel; and
- send connectivity information for the collaboration session through the control channel of the media session, wherein the connectivity information is sent via a collaboration message encoded according to the control channel of the media session.

18. A non-transitory computer readable medium including instructions that when executed are configured to cause a processor to:
- identify a request for an interactive collaboration session from a first user device; wherein the interactive collaboration session is associated with the first user device and a second user device;
- identify a media session between the first user device and the second user device, wherein the media session includes a control channel;
- receive a pull uniform resource locator message from the second user; and
- send connectivity information for the collaboration session through the control channel of the media session in response to the pull uniform resource locator message.

19. The method of claim 1, wherein the identifying, extracting, formatting, and sending are performed by a processor of a collaboration device.

20. An apparatus comprising:
a processor; and
a memory comprising one or more instructions executable by the processor to perform:
- identifying a request for a collaboration session from a first user location, the collaboration session associated with the first user location and a second user location;
- identifying a media session between the first user location and the second user location;
- extracting a collaboration address from the request for the collaboration session;
- encoding the collaboration address according to a video codec of the media session;
- formatting connectivity information for the collaboration session as a share uniform resource locator message;
- receiving a pull uniform resource locator message from the second user; and
- sending the connectivity information for the collaboration session through the control channel of the media session in response to the pull uniform resource locator message.

* * * * *